(12) United States Patent
Yang et al.

(10) Patent No.: US 11,017,042 B2
(45) Date of Patent: May 25, 2021

(54) PROFILE SPAM REMOVAL IN SEARCH RESULTS FROM SOCIAL NETWORK

(71) Applicant: Microsoft Technology Licensing, LLC, Redmond, WA (US)

(72) Inventors: Zimeng Yang, Sunnyvale, CA (US); Mohammad H. Firooz, Fremont, CA (US); Max Rogov, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 15/994,986

(22) Filed: May 31, 2018

(65) Prior Publication Data

US 2019/0370402 A1   Dec. 5, 2019

(51) Int. Cl.
| | | |
|---|---|---|
| *G06F 16/2457* | (2019.01) | |
| *G06F 16/9535* | (2019.01) | |
| *G06N 20/00* | (2019.01) | |
| *G06F 16/248* | (2019.01) | |
| *G06F 16/28* | (2019.01) | |

(52) U.S. Cl.
CPC ........ *G06F 16/9535* (2019.01); *G06F 16/248* (2019.01); *G06F 16/24578* (2019.01); *G06F 16/285* (2019.01); *G06N 20/00* (2019.01); *G06F 16/24575* (2019.01)

(58) Field of Classification Search
CPC ............. G06F 16/24578; G06F 16/248; G06F 16/24575
See application file for complete search history.

(56) References Cited

U.S. PATENT DOCUMENTS

| | | | | |
|---|---|---|---|---|
| 2007/0038705 | A1* | 2/2007 | Chickering | ............. H04L 51/12 709/206 |
| 2009/0164913 | A1* | 6/2009 | Davar | ..................... H04L 67/02 715/751 |
| 2012/0130997 | A1* | 5/2012 | Risvik | ............... G06F 16/24578 707/723 |

OTHER PUBLICATIONS

Ying et al., "An ensemble approach applied to classify spam e-mails", 2010, Elsevier. (Year: 2010).*
Wu et al., "Propagating Trust and Distrust to Demote Web Spam", 2006, Citeseer. (Year: 2006).*
Irani et al., "Study of Static Classification of Social Spam Profiles in MySpace", 2010, Association of Artificial Intelligence. (Year: 2010).*

* cited by examiner

*Primary Examiner* — Apu M Mofiz
*Assistant Examiner* — Sheryl L Holland
(74) *Attorney, Agent, or Firm* — Schwegman Lundberg & Woessner, P.A.

(57) ABSTRACT

Techniques for improving a search user interface by demoting a set of spam user profiles included in a listing of candidate user profiles that are to be presented in response to a search request are disclosed herein. The search request is received from a client device. The search request requests the listing of candidate user profiles corresponding to a search query. The listing of candidate user profiles corresponding to the search query is determined. A trained spam detection model is applied to each of the candidate user profiles to identify the set of spam user profiles. The demoting of the spam user profiles is performed. The listing of candidate user profiles is communicated for presentation in the search user interface, the presentation reflecting the demoting of the spam user profiles.

14 Claims, 21 Drawing Sheets

Adelyn Beascoechea Donnelly
Cashier at Joe's Market & Cafe
Tampa/St. Petersburg, Florida Area
InMail
adelyn Adelyn Thimote
pt. acct. rep. at st joe's hospital
Greater Los Angeles Area
InMail
Adelyn Adelyn Klarin
--
United States
InMail
Adelyn Adelyn
Student at AVC
Greater Los Angeles Area
InMail
*FIG. 5*

600

Damien Dsouza - 3rd
DESIGNER COMMUNERS AND THE WHOLE OPERATIONS CHIEF OF ALL...
Mumbai Area, India

[InMail]

Current: Prevailing and All Service IN DUTY and IN OPERATIONS Main and Central Official Representative at ICC India

Supreme Chief of Distributed Organisations of India
indianonlinegrocery.com
Feb 2009 – Present • 8 yrs 3 mos
See description ⌄

Supreme Chief of Distributed Organisations of India
eazygrocery.com
Feb 2009 – Present • 8 yrs 3 mos
See description ⌄

Supreme Chief of Distributed Organisations of India
Localbanya.com
Feb 2009 – Present • 8 yrs 3 mos
See description ⌄

Supreme Chief of Distributed Organisations of India
EkStop.com
Feb 2009 – Present • 8 yrs 3 mos
See description ⌄

Supreme Chief of Distributed Organisations of India
AaramShop
Feb 2009 – Present • 8 yrs 3 mos
See description ⌄

Supreme Chief of Distributed Organisations of India
AtMyDoorsteps.com
Feb 2009 – Present • 8 yrs 3 mos
See description ⌄

Supreme Chief of Distributed Organisations of India
ZopNow.com
Feb 2009 – Present • 8 yrs 3 mos
See description ⌄

Associate Director
J.P. Morgan
Oct 2008 – Present • 8 yrs 7 mos
See description ⌄

Collective Home Commander
J.P. Morgan
Oct 2008 – Present • 8 yrs 7 mos
See description ⌄

Head of Reference Team
J.P. Morgan
Oct 2008 – Present • 8 yrs 7 mos
See description ⌄

People results for san francisco - 4,174,839 results

Rimma Ludoviccioni San Francisco Real Estate Agent Broker-rd
San Francisco Bay Area Short Sale Real Estate Agent at Short Sale Genius  [InMail]
San Francisco Bay Area Current: San Francisco Bay Area Real Estate Broker at Joe's Realty -Sa...
Estate Services www.joesrealestate.com

Hotel Nikko San Francisco - 3rd
Premier San Francisco Hotel  [InMail]
San Francisco Bay Area Current: Hotel Nikko San Francisco at Hotel Nikko San Francisco

Garage Doors San Francisco
Garage Doors San Francisco at Garage Doors San Francisco  [InMail]
San Francisco Bay Area

Veteran Car Donations San Francisco
Veteran Car Donations San Francisco at Veteran Car Donations San Fran...  [InMail]
San Francisco Bay Area

Emergency Plumber San Francisco
Plumber at Emergency Plumbing San Francisco at Emergency Plumbing S...  [InMail]
San Francisco Bay Area

*FIG. 7*

| | Pros | Cons | Accessible features |
|---|---|---|---|
| Filter in index | Low cost to serve<br>Easy to experiment | Precision must be 100% | Document related |
| Filter during retrieval | Num to score | Inverted index cost<br>Precision must be high | Document related (limited)<br>Query based |
| Post retrieval | No index cost | Cost to serve<br>Precision must be high | Document related (limited)<br>Query based |
| Demote in ranking | Can be learned by ranking model | Bad results stay in the result set | Document related (limited)<br>Query based<br>Ranking features |
| Filter post ranking | Precision can be relaxed | Being too aggressive may hurt recall | Document related (limited)<br>Query based<br>Ranking features<br>Ordering based features |

FIG. 10

FIG. 13A
FIG. 13B
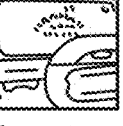
FIG. 13C

| Feature name | Description |
|---|---|
| isPosEmpty | Is the position field empty |
| isEduEmpty | Is the education field empty |
| isFnLnSame | Is first name and last name the same |
| isFnLnDuplicate | Is first name contained in last name or last name contained in the first name |
| isCompanyTitleSame | Is company and title the same |
| isNameTitleSame | Is name and title the same |
| isNameCompanySame | Is name and company the same |
| maxWordFreq | The maximum frequency of the words appearing in the profile |
| maxCharFreq | The maximum frequency of the characters appearing in the profile |
| uniqueCharNum | The number of unique characters |
| uniqueCharRatio | The number of unique characters divided by total number of characters |
| multiStreamMatch | Whether profile has the same word in fn, ln, headline, company/title and education |
| numCurrPos | Number of current positions |
| numPrevPos | Number of previous positions |
| numEdu | Number of educations |
| numStdEdu | Number of standardized educations |
| numDuplicatePositions | Number of duplicate position records |
| fn_in_lexicon | Is profile first name a person's name |
| ln_in_lexicon | Is profile last name a person's name |
| num_spam_word | The number of company stop words in profile first and last name |
| is_spam_bigram | If any company bigram stop words exist in first and last name |
| num_skills | Number of skills in the profile |
| num_std_companies | Number of standardized companies |
| headline_match_name | If members first and last name exactly match the member's headline |
| Is the profile picture contains human face | This hasn't been implemented yet |

*FIG. 14*

```
NOT (fn_in_lexicon AND ln_in_lexicon) -- if both are in lexicon ignore
  AND
  ( is_spam2   -- if the stopping phrases is in name accept
    OR
    ((NOT fn_in_lexicon OR NOT ln_in_lexicon) AND is_spam >= 2) -- if at least one of
them is not in lexicon and two spam words accept
    OR
    ((NOT fn_in_lexicon OR NOT ln_in_lexicon) AND (headline_match_name OR
company_exact_match_name OR title_exact_match_name))
    OR
    ((NOT fn_in_lexicon AND NOT fn_in_lexicon) AND (is_spam >=1 OR
company_match_name OR title_match_name))
  )
```

FIG. 15

```
@outputSchema("int")
def tree(in_in_lexicon, in_in_lexicon, is_spam, is_spam2, company_match_name,
company_exact_match_name, title_match_name, title_exact_match_name, num_skills, num_positions,
num_std_companies, num_std_schools, headline_match_name):
  if num_std_companies <= 0.5:
    if num_positions <= 0.5:
      if num_std_schools <= 0.5:
        if num_skills <= 1.5:
          return 1
  ...
```

*FIG. 16*

PROFILE SPAM REMOVAL IN SEARCH RESULTS FROM SOCIAL NETWORK

TECHNICAL FIELD

The present application relates generally to improved searching algorithms and user interfaces and, in one specific example, to methods and systems of improving a user interface for presenting user profile search results by removing spam user profiles from the search results.

BACKGROUND

A social-networking system, such as LinkedIn, may achieve benefits (e.g., more efficient use of processing and memory resources) by improving the degree to which search results match search queries, including search queries for people, job openings, companies, and so on, that are presented in a search results user interfaces. For example, more accurate search results may make for less searching by users, reducing the number of search queries that must be processed. Designing a user interface that presents only the most relevant profiles as matching a user profile search query may pose difficult technical problems, including weeding through a universe of user-created profiles in a search domain that almost inevitably includes a percentage of spam profiles, including dummy or fake profiles. When included in search results, these spam profiles may harm the search experience for a user. For example, users may have difficulty parsing through a large set of search results presented in a user interface to find content items that are most relevant to a search query.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 5 is a user interface screenshot depicting an example of a search results listing that includes a spam user profile of the "low-quality" classification in the search results.

FIG. 6 is a user interface screenshot depicting an example of a search results listing that includes a spam user profile of the "user profile field abuse" classification in the search results.

FIG. 7 is an example user interface screenshot depicting an example of a search results listing that includes spam user profiles of the "non-human" classification in the search results.

FIG. 10 is a table listing a summary of the pros and cons of different filtering and demotion strategies, including the document features that are available at each processing stage.

FIG. 13A-13C are additional example user interface screens for a data collection user interface for collecting human-labelled data for generating rules or training a machine-learned model for filtering spam user profiles from search results.

FIG. 14 is a listing of example features and their corresponding descriptions.

FIG. 15 is an example pseudo-code listing describing a few initial rules that may be generated based on the identification of the example features.

FIG. 16 is an example of a partial representation of a machine-learned model as a Python function.

DETAILED DESCRIPTION

Example methods and systems of enhancing usability and electronic resource efficiency using search query matching algorithms and user interfaces are disclosed. In the following description, for purposes of explanation, numerous specific details are set forth in order to provide a thorough understanding of example embodiments. It will be evident, however, to one skilled in the art that the present embodiments may be practiced without these specific details.

In example embodiments, techniques for improving a search user interface by demoting a set of spam user profiles included in a listing of candidate user profiles that are to be presented in response to a search request are disclosed herein. The search request is received from a client device. The search request requests the listing of candidate user profiles corresponding to a search query. The listing of candidate user profiles corresponding to the search query is determined. A trained spam detection model is applied to each of the candidate user profiles to identify the set of spam user profiles. The demoting of the spam user profiles is performed. The listing of candidate user profiles is communicated for presentation in the search user interface, the presentation reflecting the demoting of the spam user profiles.

In example embodiments, one or more modules are specially designed (e.g., through computer programming logic) and incorporated into one or more memories of a networked system (e.g., via a computer-implemented deployment process) to specially configure one or more computer processors of the networked system to perform one or more of the operations described herein.

Figure 1:
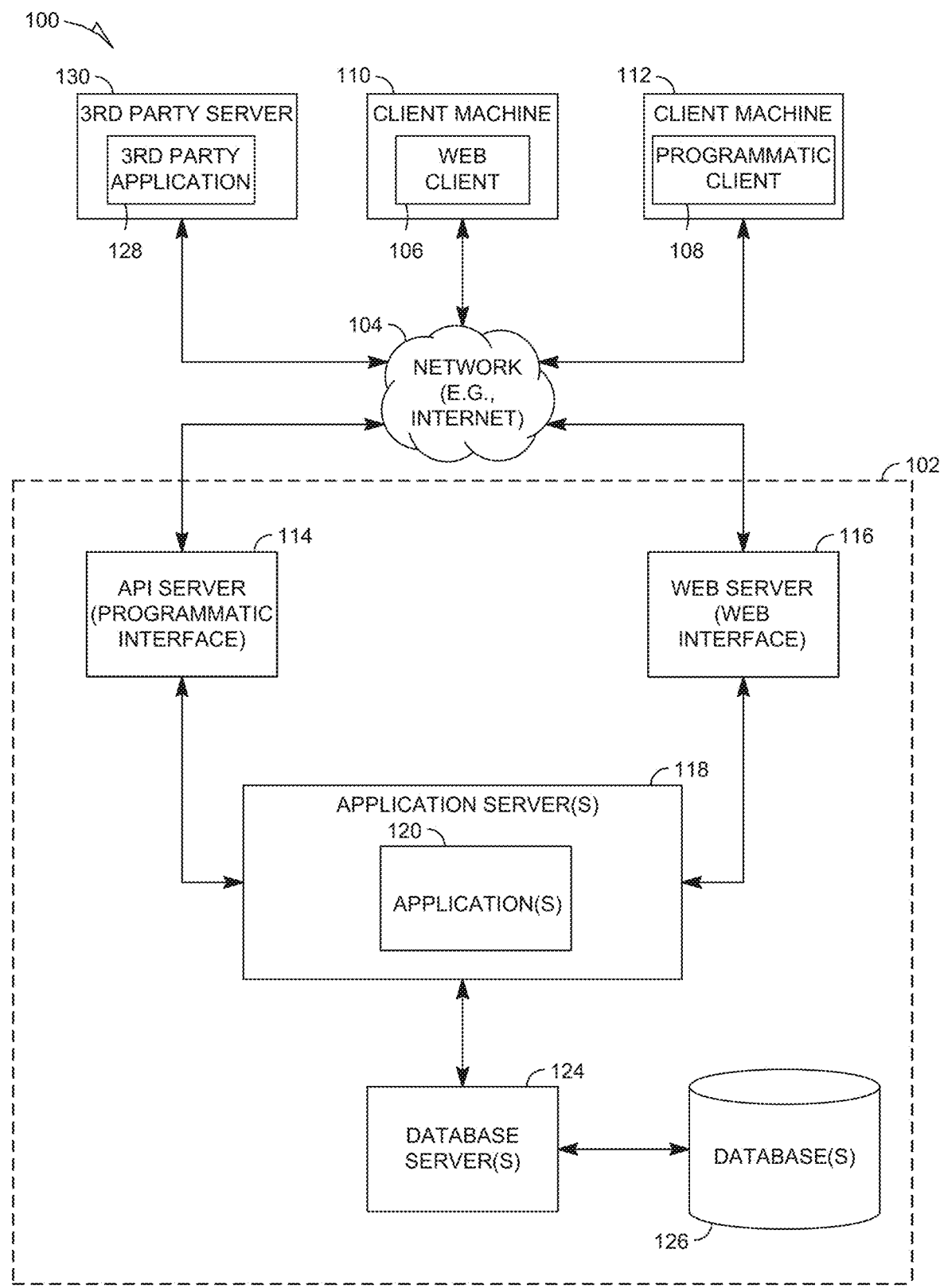
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third-party application 128, executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by the third party. The third-party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device. In some embodiments, the networked system 102 may comprise functional components of a social networking service.

Figure 2:
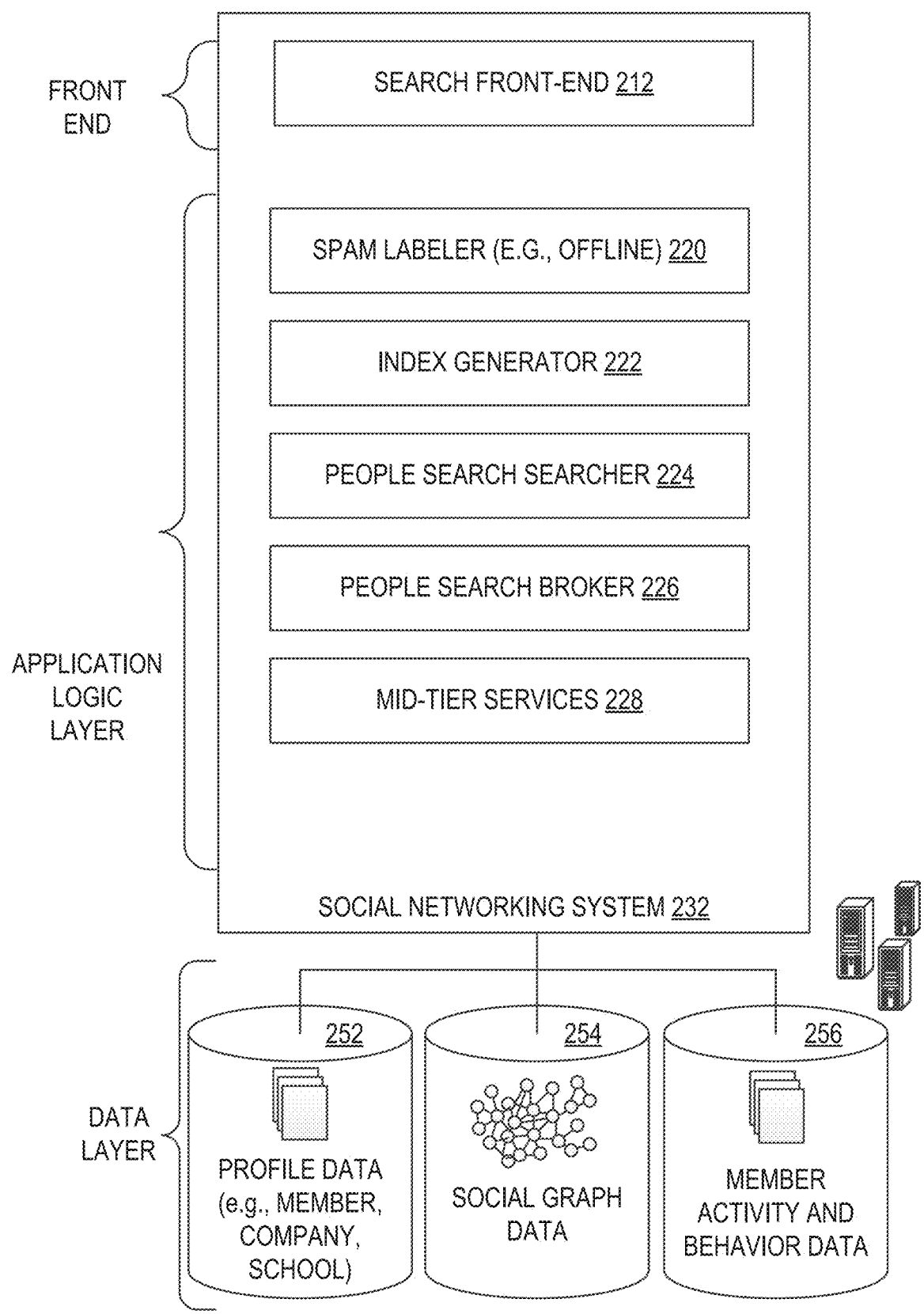
FIG. 2 is a block diagram showing the functional components of a social networking service within a networked system, in accordance with an example embodiment.

As shown in FIG. 2, front-end components, including a search front-end 212, may comprise a user interface module (e.g., a web server), which receives requests from various client-computing devices, and communicates appropriate responses to the requesting client devices. For example, the user interface module(s) may receive requests in the form of Hypertext Transfer Protocol (HTTP) requests, or other web-based, application programming interface (API) requests. Upon detecting a particular interaction, the front-end components may log the interaction, including the type of interaction and any meta-data relating to the interaction, in a member activity and behavior database 256.

An application logic layer may include one or more various application server modules, which, in conjunction with the user interface module(s), generate various user interfaces (e.g., web pages) with data retrieved from various data sources in the data layer. With some embodiments, application server modules are used to implement the functionality associated with various applications and/or services provided by the social networking service. In some example embodiments, the application logic layer includes execution of high-level scripting applications (e.g., Pig/Hadoop applications), execution of batch jobs (e.g., Azkaban jobs), and so on. In example embodiments, the application logic layer includes spam labeler 220, index generator 222, people search searcher 224, people search broker 226, and mid-tier services 228, each of which is described in more detail below.

As shown in FIG. 2, a data layer may include several databases, such as a database 252 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 252. Similarly, when a representative of an organization initially registers the organization with the social networking service, the representative may be prompted to provide certain information about the organization. This information may be stored, for example, in the database 252, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 254.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 256. This logged activity information may then be used by the Top Jobs system 220.

In some embodiments, databases 252, 254, and 256 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. Such applications may be browser-based applications, or may be operating system-specific. For example, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the front-end and back-end systems are referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) within the scope of the present disclosure.

Figure 3:
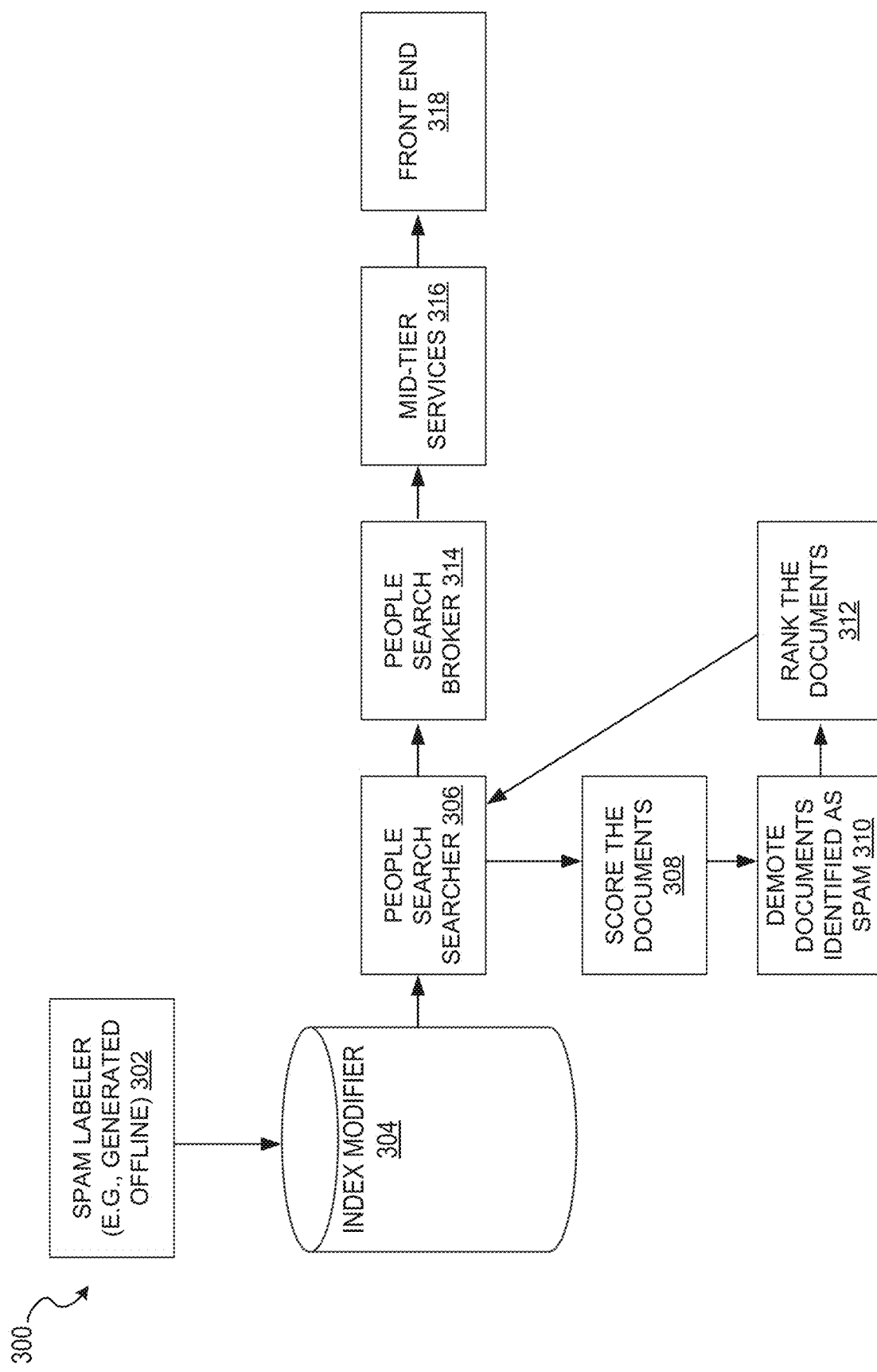
FIG. 3 is a block diagram illustrating offline data/model generation and online query processing that is performed by one or more modules of the social networking system.

FIG. 3 is a block diagram illustrating an example architecture for an improved user interface for searching for user profiles or member profiles within the social networking system 232. In example embodiments, spam labels are generated offline (e.g., at a predetermined time interval) by a spam labeller 302. The spam labeller may apply a rule-based or machine-learned model (described in more detail below) to identify user profiles (e.g., that are included the profile data 252) as spam user profiles.

For each user profile that is identified as a spam user profile, an index modifier 304 may modify a corresponding index entry for the user profile to indicate the identification. For example, the index modifier may modify the index entry for the user profile to include a spam field, as described in more detail below. In example embodiments, the spam field may include information pertaining to classification(s) of the spam user profile, as described in more detail below. Alternatively, the index modifier 304 may remove the user profile from the index.

The updated database index may then be made available to an online people searcher 306, which may perform online processing of search queries (e.g., as entered via a search user interface on a client device or received via an API call from an application executing on the networked system or a client device). At 308, the people searcher 306 may, upon application of one or more matching algorithms, generate search results including one or more documents (e.g., representing user profiles). In example embodiments, the people searcher 306 may filter out an initial set of user profiles included in the search results that have been previously identified as spam user profiles (e.g., based on spam fields for the set of user profiles being detected in the database index). At 308, the people searcher 306 may assign an initial score to the remaining documents (e.g., from profile data 252) that match the terms of the search query. The initial score may represent the relative closeness of the documents in terms of their matching to the terms of the search query. At 310, the people searcher 306 may identify a set of user profiles included in the search results that are spam user profiles. In example embodiments, this set of user profiles were not previously identified (e.g., by the offline spam labeller 302) as being spam user profiles, but are nevertheless detected during online processing as being spam user profiles. Thus, because many spam user profiles may be filtered out based on offline processing, the online processing required to identify additional spam user profiles (e.g., spam user profiles that were not in existence at the time of the offline processing or not included in a batch of profiles processed during a particular period of offline processing) is reduced. In example embodiments, the online identification of user profiles as spam user profiles may be based on an additional application of a rule-based or machine-learned model to one or more of the search results that survive the initial filtering. Each of the set of user profiles identified as additional spam user profiles may then be demoted in the search results. For example, at 312, their ranking scores may be decreased by a predetermined amount.

The people searcher 306 may provide the reranked documents to a people search broker 314, which may, in turn, distribute the reranked documents to one or more mid-tier services 316, such as search services or browse services. The results of the search query may then be presented in a front-end corresponding to a mid-tier service, such as a people search results front-end or a people browsing front-end. The front-end 318 may generate a user interface that reflects the reranking of the documents, which may be presented on a client device.

Figure 4:
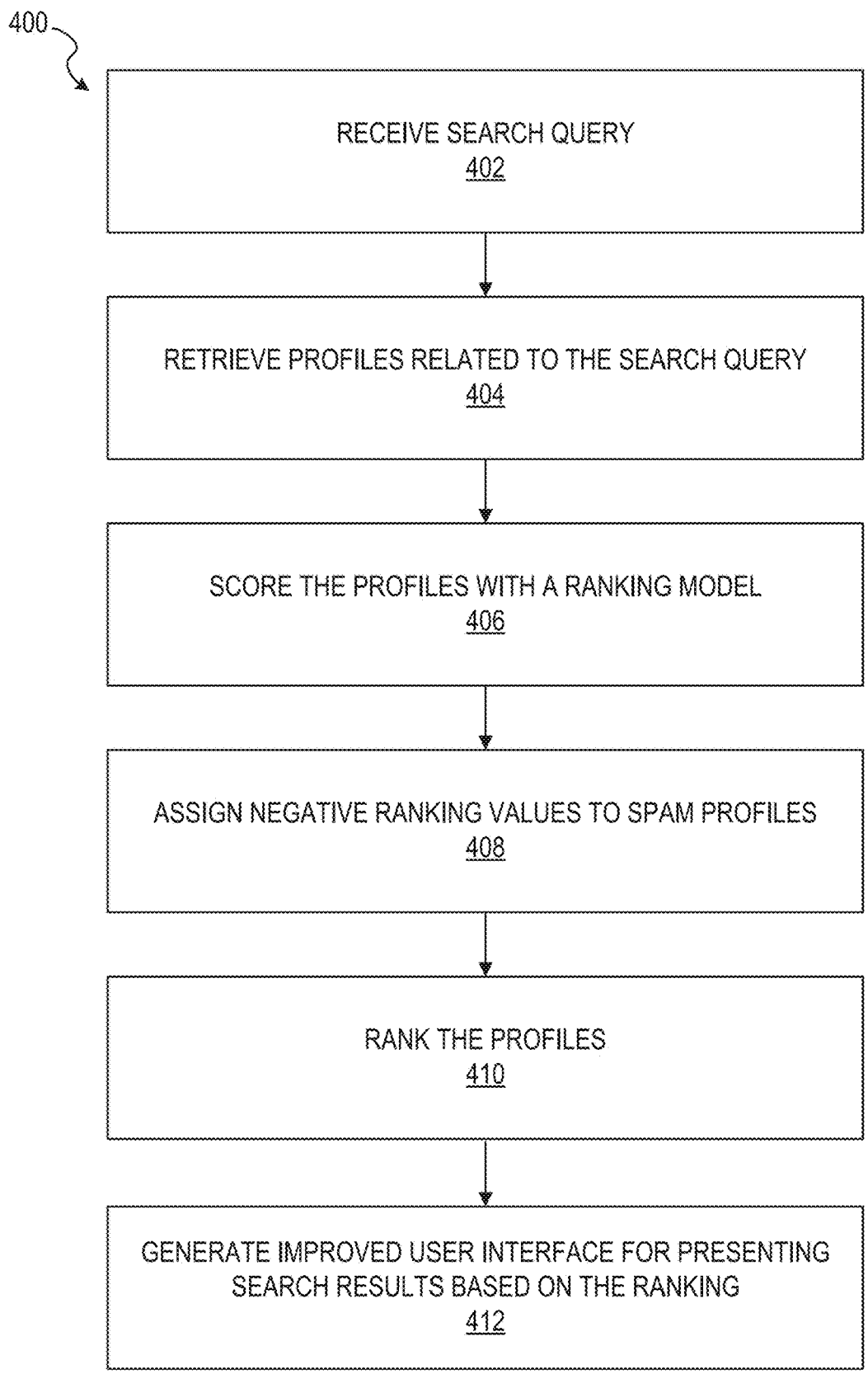
FIG. 4 is an example method of generating an improved user interface for searching for user profiles within the social networking system.

FIG. 4 is an example method 400 of generating an improved user interface for searching for user profiles within the social networking system 232. In example embodiments, the operations are performed by one or more modules of the front-end or application logic layer of the social networking system 232.

At operation 402, a search query is received. For example, a search query is entered into a search results user interface presented on a client device or received in an API call from an application executing on a networked system or a client device.

At operation 404, user profiles related to the search query are received. For example, user profiles matching terms of the search query (e.g., based on application of one or more matching algorithms) are retrieved. In example embodiments, the retrieved user profiles do not include a set of user profiles that are stored in a database of the networked system but that have been previously identified as being spam user profiles (e.g., based on offline processing of the spam labeller 202 to user profiles stored in the databased of the networked system at the time of the offline processing or online processing of user profiles that were not included in the offline processing). The spam user profiles may be identified based on detection or analysis of a spam field having been included in index entries associated with the spam user profiles.

At operation 406, the remaining user profiles (e.g., the user profiles that were not filtered out during retrieval) are assigned an initial ranking score based on their relative closeness in matching to the search terms included in the search query.

At operation 408, an amount is subtracted from the ranking score of any user profile that is identified as being a spam user profile. For example, a rule-based or machine-learned model is applied to each of the user profiles in the result set (e.g., that survived initial filtration) to identify whether the user profile is a spam user profile. If so, the amount is subtracted from the initial ranking score. In example embodiments, the amount may be a predetermined or fixed amount. In example embodiments, the amount may be weighted based on one or more classifications of spam with which the user profile is associated. Thus, user profiles that are more "spammy" (e.g., that are associated with more spam classifications or a spam classification having more significance) may have their initial ranking scores decreased by a larger amount than user profiles that are less spammy. The spammyness of a profile or significant of spam classifications may be determined by the rules-based or machine-learned model. Additionally, database index entries corresponding to identified spam user profiles may be modified to include a spam field that includes information pertaining to the result of the application of the rules-based or machine-learned model to the spam user profiles, such as spam classifications associated with the spam user profiles.

At operation 410, the user profiles matching the query are reranked based on their adjusting ranking scores.

At operation 412, the rankings are communicated to an application for presenting of the user profiles in a user interface. The user interface may, for example, bury the demoted spam user profiles at the end of the search results corresponding to the search query or even hide the lowest-ranked user profiles altogether from the search results.

Examples of classes of spam user profiles may include low quality user profiles, user profiles that abuse standard profile data fields by deliberately including content that is designed to fool the relevancy/ranking algorithms of the networked system, non-human profiles (e.g., user profiles that represent a company or group instead of a person), and self-promotion or advertisement profiles.

FIG. 5 is an example user interface screenshot depicting an example of a search results listing that includes a spam user profile of the "low-quality" classification in the search results. Here, the user profile ("Adelyn Adelyn Klarin"), is included as the third search result (e.g., for a user profile search query that includes the term "Adelyn"). Although the search results user interface may typically depict a snippet of information for each person appearing in the search results, such as first name, last name, title, employer, specific location, degree of connection to the searcher, and shared connections to the searcher, the third result includes only a name and a general location. Search results like this third search result may be deemed low-quality (e.g., by the rules-based or machine-learned model) at least partially because they are unlikely to be a match for the search query that has enough accuracy to result in a user click. Furthermore, search results like this may be deemed harmful to the user experience (e.g., by the rules-based or machine-learned model) because, for example, they may appear higher in the search results listing than a potentially more accurate match. For example, the fourth search result, which includes content for each of the title and employer fields, as well as a more specific location, is ranked lower in the rankings than the third result (e.g., based on the initial search/relevancy score giving more weight to matching of keywords included in the query to the name field than other considerations, such as user profile quality). Application of the rules-based or machine-learned model to such a search results listing would result in the third search result being identified as a spam user profile of low-quality classification and would likely result in a demoting of the third search result such that the third search result would appear at or near the bottom of the list (or not at all) in the search results user interface.

FIG. 6 is a user interface screenshot depicting an example of a search results listing that includes a spam user profile of the "user profile field abuse" classification in the search results e.g., a user profile that abuses fields reserved for particular types of content). Here, various fields of a user profile associated with the user "Damien Dsouza" have been filled with content in order to confuse the ranking or relevance algorithms of the networked system into providing an initial ranking score for the user profile that is higher than it would other receive. For example, title or position fields for current or past positions or education fields for current or past educational attainment associated with the user profile may be stuffed with keywords. Or, as another example, the user profile may include an unreasonably high number (e.g., 20 or more) of combinations of current or past positions relative to other users of the networked system. In example embodiments, such user profile field abuses may cause the search or relevance ranking system of the networked system to identify more matches between keywords included in the search query and content included in the fields of such user profiles, resulting in an artificially-high initial ranking score being assigned to such user profiles. Such profiles may appear to have some relevance to searchers (e.g., because they may appear higher in the search results listing or include at least some matching of relevant keywords in the surfaced snippet), and thus may have at least a small likelihood of being clicked on in the search results (e.g., as determined by the rules-based or machine-learned model), but such profiles may nevertheless harm the user experience (e.g., based on online user feedback, quality assessments, or surveys indicating that the clicked-on link brings up a user profile that includes redundant information, exaggerated, or false information that is difficult to wade through or is otherwise not directly responsive to the search query). Application of the rules-based or machine-learned model to a search results listing including a spam user profile of the "user profile field abuse" classification would result in a demoting of such search results such that they would appear at or near the bottom of the list (or not at all) in the search results user interface.

FIG. 7 is an example user interface screenshot depicting an example of a search results listing that includes spam user profiles of the "non-human" classification in the search results. Here, the search query for user profiles includes the term "san francisco." However, all but the first link in the listing of search results correspond to non-human profiles, such as company profiles and group profiles. Given that the context for the search is user profiles, the intent of the search query is likely to be an exploratory search for user profiles for people working or studying in San Francisco (e.g., based on positions, schools, or skills). Thus, including non-human profiles in the search results is likely to harm the user experience, just as with spam user profiles of other classifications. Application of the rules-based or machine-learned model to a search results listing including a spam user profile of the "non-human" classification would result in a demoting of these spam user profiles such that they appear at or near the bottom of the list (or not at all) in the search results user interface, thus reducing the negative effects of users accidentally creating "user" profiles for non-human entities or reducing the incentive for users to purposely misrepresent a profile for a non-human entity as a "user" profile.

Figure 8:
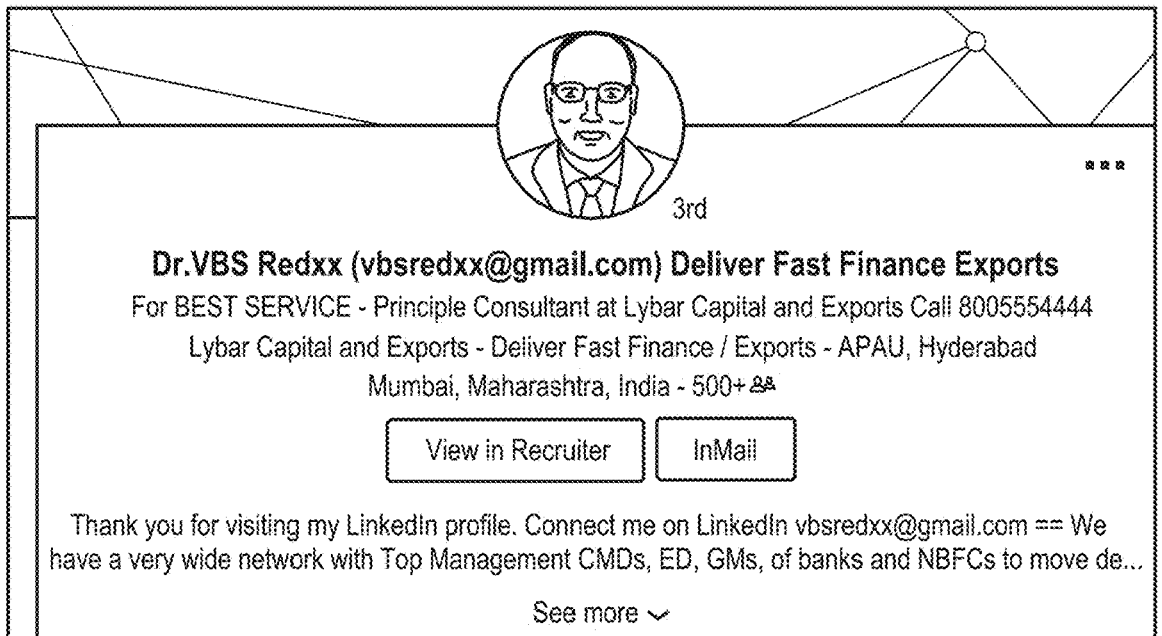
FIG. 8 is an example user interface screenshot depicting an example of a search results listing that includes a spam user profile of the "self-promotion" or "advertisement" classification in the search results.

FIG. 8 is an example user interface screenshot depicting an example of a search results listing that includes a spam user profile of the "self-promotion" or "advertisement" classification in the search results. Here, a user profile has been created in an attempt to not only trick the matching or relevancy algorithms of the networked system into assigning an artificially-high ranking score to the user profile for particular search queries, but also to masquerade as an advertisement or self-promotion for a commercial benefit of a person or organization. In example embodiments, such spam user profiles of the "self-promotion" or "advertisement" classification may use a different word dictionary than typical non-spam user profiles. For example, such spam profiles may include keywords like "call (xxx) xxx-xxxx," "email me," "best service," "earn money," and so on. Thus, such spam profiles may be identified based on a correspondence between content include in various fields of the user profile and a special dictionary associated with such spam profile. Application of the rules-based or machine-learned model to a search results listing including a spam user profile of this classification would result in a demoting of these spam user profiles such that they appear at or near the bottom of the list (or not at all) in the search results user interface, thus improving the user experience.

In example embodiments, spam user profiles of a first classification may be demoted by a configurable amount that is different from a configurable amount by which spam user profiles of a second classification are demoted. For example, spam user profiles of the "user profile field abuse" category may be demoted by a first configurable amount and spam user profiles of the "low-quality" classification may be demoted by a second configurable amount, wherein the first configurable amount is higher or lower than the second configurable amount (e.g., based on application of the rules-based or machine-learned model or administrator preference settings). It should be noted that improving the user experience and accuracy of the search results presented, as discussed above, will reduce system resource requirements, such as processor and memory requirements, because users will be able to find appropriate search results for their search queries more quickly, reducing the likelihood that they will need to perform multiple searches to satisfy their needs. In example embodiments, a machine-learned model is trained to achieve a target reduction in system resource requirements.

Figure 9:
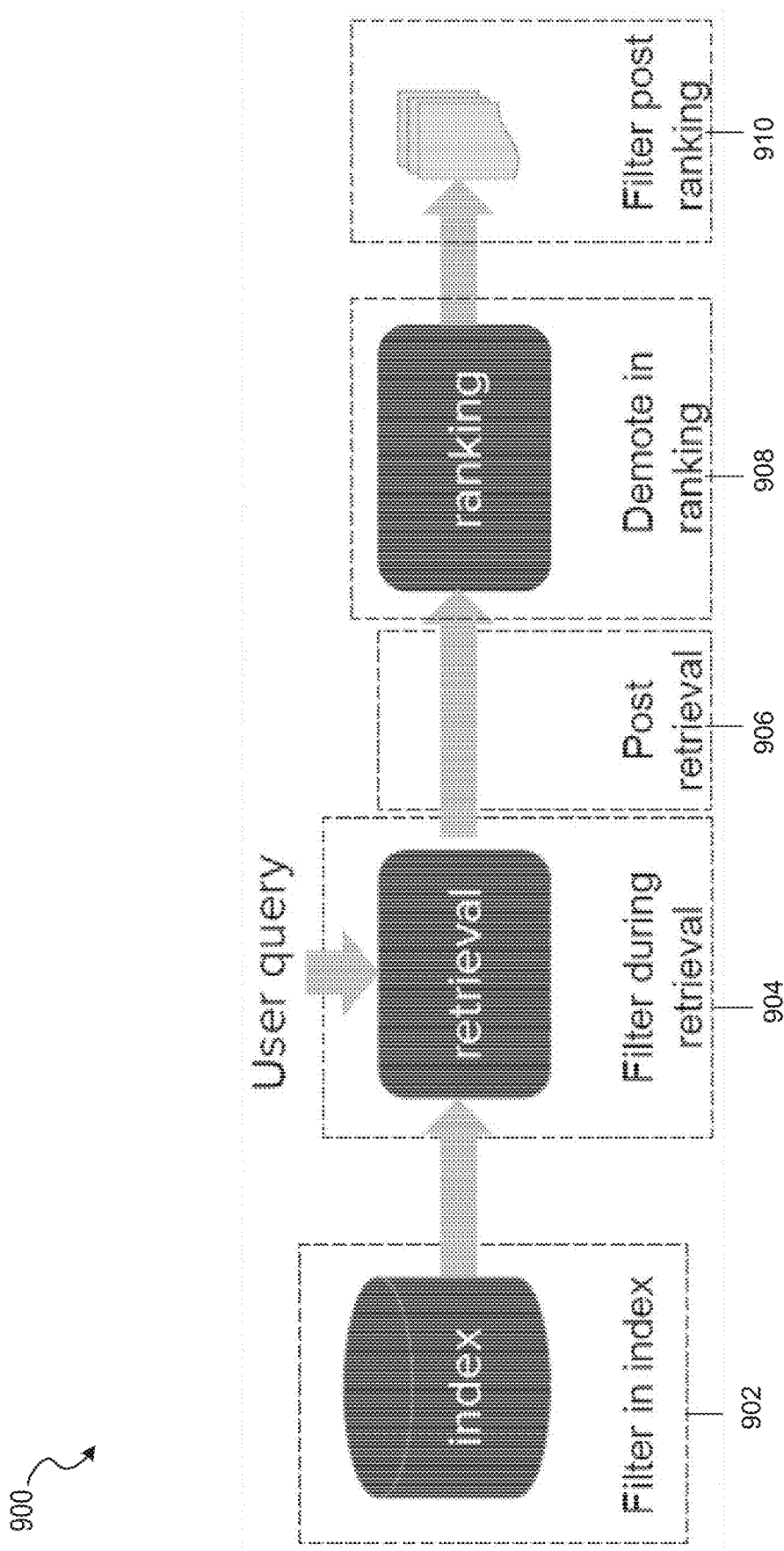
FIG. 9 is a block diagram illustrating various possible strategies for filtering out spam user profiles from search results that are generated in response to a search query.

FIG. 9 is a block diagram illustrating various possible strategies for filtering out spam user profiles from search results that are generated in response to a search query. These strategies include filtering spam profiles from database index entries associated with the user profiles matching the search query, filtering spam user profiles out before assigning ranking scores to the user profiles, and filtering spam user profiles out after assigning ranking scores to the user profiles. Each strategy has its own advantages and disadvantages; therefore, the strategy that is selected will depend on the scenario. In example embodiments, one strategy or a combination of strategies may be selected for each of one or more scenarios based on one or more criteria, including the ability of the one or more strategies to detect spam user profiles corresponding to one or more of a set of spam classifications, evaluate an impact of analyzing different features of user profiles to filter out spam user profiles, achieve a high recall (e.g., to improve a sensitivity or fraction of relevant instances that have been retrieved over the total amount of relevant instances such that the sensitivity exceeds a sensitivity threshold) for the spam user profiles, or improve search accuracy (e.g., to improve precision, or positive predictive value, or fraction of relevant instances among the retrieved instances, such that the precision exceeds a precision threshold), or improve sign post metrics.

In example embodiments, the system may filter out spam user profiles during the index building stage 902, preventing them from being indexed directly. This approach has the benefit of saving index space, as, in example embodiments, people search index size growth may be a concern. For example, a doubling in the middle index size may roughly amount to loss of 20% capacity and higher latency. If the system can get rid of unnecessary documents in the index, there would likely be a significant performance improvement. But this approach also has disadvantages. For example, it may hurt recall on connection-based searches. For example, users associated with spam user profiles should be able to find themselves in the search results and people in the spam users' first degree should also be able to find them, even though such profiles are considered spam user profiles. Thus, removing spam user profiles from index requires care to avoid false positives. These spam user profiles may not be recoverable if they are completed removed from the profile data.

In example embodiments, the system may filter out spam user profiles during the retrieval stage 904. For this approach, the filter may be applied in the retrieval process (e.g., in a rewriter), before the scoring process. The filtering model may be calculated offline and added to an inverted index, which is then applied in the rewriter. An advantage of this approach is that, in retrieval, the system can kill the spam user profiles and fill their spots with good quality results, which results in more good candidates for assigning ranking scores. A concern for this approach is that, if it is desirable for the system to do soft filtering, keeping the spam results for certain scenarios, the system will not have access to the documents at the retrieval stage. Therefore, although the system can do query classification to trigger the spam filtering on different sets of queries, the system cannot use document matching information to decide whether to filter the results or not. However, this approach may be the best option in scenarios where the filtered documents are a large percentage of the total documents, or the filtering model becomes too expensive with respect to one or more metrics, such as crossing one or more configurable thresholds associated with processing or memory resource usage.

In example embodiments, the system may filter out spam user profiles in a post-retrieval stage 906. Compared to filtering during retrieval, post-retrieval filtering applies the filtering model after the retrieval stage and before scoring. For this approach, the system can either calculate the spam features offline and add them into the forward index, or calculate the features online. In contrast to filtering during retrieval, this approach has the disadvantage that the spam profiles retrieved will take up space of good profiles, and, after the system filters them out, there will be no good candidates to fill up the space. So, generally, this approach may be more applicable when the filtered percentage is small relative to the total number of documents. This approach has a significant benefit that the system can make use of the document information, like the degree, name matches, and other matching features (e.g., corresponding to fields of the user profile), etc. to do soft filtering and trigger the filter under certain scenarios.

In example embodiments, spam user profiles may be demoted in the rankings at a demotion stage 908 (e.g., as discussed above). In example embodiments, spam user profiles that are demoted are not so bad or "spammy" that they should be filtered out of the search results (e.g., based on a ranking score assigned to each of the user profiles not transgressing a predetermined, administrator-configurable, or machine-learned filter threshold). Examples of user profiles that may survive filtration include profiles with duplicated names (e.g., "Obama Obama," "Dillon Pratt Dillon Pratt," and so on), profiles with very long names (e.g., "Christopher Steve We Hurt With the Things We Want to Say"), or profiles that have a number of empty fields that transgress a predetermined, administrator-configurable, or machine-learned empty fields threshold. To demote the ranking of these profiles may be a good way to avoid them affecting the search quality. An advantage of the demotion approach is that the networked system may apply the spam features together with other ranking features to learn the model. But it has the disadvantage that the spam profiles still stay in the result sets.

In example embodiments, the system may filter out spam user profiles in a post-ranking stage 910. At this stage the ordering information for the results is available. Thus, it is possible to decide whether to filter a spam document by comparing it with the result set. This gives the advantage that the precision for spam detection can be relaxed, as long as there are enough good results. But the downside is that there may be fewer results to return. The recall might be hurt if the filtering is too aggressive.

FIG. 10 is a table listing a summary of the pros and cons of different filtering and demotion strategies, including the document features that are available at each stage (e.g., for generating, updating, or fine-tuning a machine-learned model). The pros and cons may of each strategy may be considered by the system when selecting one strategy or a combination of strategies for a particular scenario.

Figure 11:
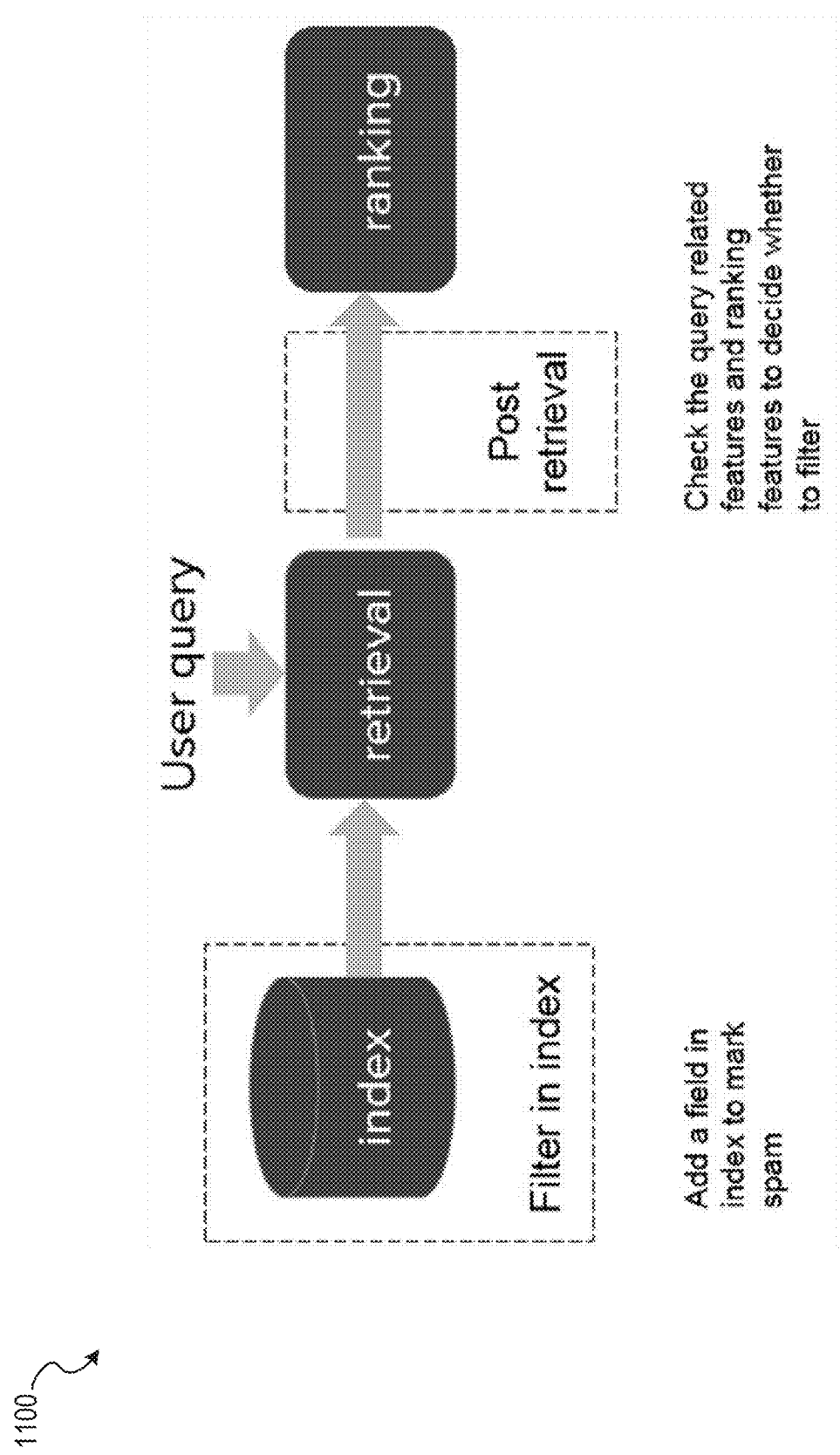
FIG. 11 is a block diagram illustrating an example selection of a combination of filtering strategies for a particular scenario.

FIG. 11 is a block diagram illustrating an example selection of a combination of filtering strategies for a particular scenario. Here, operations are performed both at the filtering stage and at the post-retrieval stage. For example, this particular combination of strategies may be selected as optimal for the particular scenario based on an analysis of the pros and cons of the combination of strategies in relation to the scenario. For example, the selection of the strategies may be based on an identification (e.g., by a rules-based or machine-learned model) of a need for the system to conserve database index space (e.g., based on a number of user profiles in the database exceeding a user profile count or size threshold), as well as a determination (e.g., by a rules-based or machine-learned model) that the filtered out profiles are likely to represent a small percentage (e.g., under a filter percentage threshold) of the total profiles. In example embodiments, an index field (e.g., a spam field) is added to the forward index corresponding to user profiles that have been identified as spam user profiles (e.g., during an offline index building phase or other phase). Then, during a post-retrieval phase, the features of retrieved documents corresponding to a search query are checked to determine whether to perform additional (e.g., "soft" filtering) on queries that survive the initial filtering during the retrieval phase.

In example embodiments, query-independent filtering on the profiles may be triggered for some or all types of queries, or query-based filtering may be triggered for certain classes of queries. Examples of query classes are navigational queries, exploratory queries, title queries, company queries, etc. Query-based filtering also looks at matched information between the query and the document. In example embodiments, some spam types may be flagged for filtering no matter what the queries are; for example, the non-human profiles and self-promotion/ads profiles may be flagged for automatic filtering. Query-independent filtering may identify those profiles based on offline analysis or computations. For other spam types, such as user profiles with low quality or abuse, a more careful strategy (e.g., soft-filtering) may be selected and applied because, although these profiles may be considered as spams that harm the search engine quality, they are not fake profiles that should be completely restricted. For these cases, the system may do query-based filtering.

In general, rule-based models may be used when data is scarce. For example, the system may manually label the spam profiles based on rules when there is not enough data to implement a machine-learning based approach. The rule-based models may be based on "domain knowledge" to bridge the gap caused by data scarcity. Additionally, rule-based models may be used for initial solutions to various simple problems (e.g., identifying various threshold values described herein, choosing the appropriate combination of filtering or demotion strategies for a particular scenario, and so on) because the models are simple and the rules allow iteration over candidate solutions quickly (e.g., without an expensive training cycle). However, when the rules-based model becomes more and more complex, tuning the parameters may transgress a threshold of difficulty or cost, which may justify transition into use of a machine-learned model. So, in the beginning stages, the system may start with a rule based model. Then, as more features and data are accumulated, the system may transition to train a machine-learned model, or use a hybrid approach that make the best use of both approaches. The system may also utilize the output of the rule based model (e.g., over an initial time period) as features in the machine-learned model. Moreover, the system may use machine-learned models to correct and generate rules for corresponding rules-based models.

Figure 12A:
FIG. 12A-12C are example user interface screens for a data collection user interface for collecting human-labelled data for generating rules or training a machine-learned model for filtering spam user profiles from search results.

FIG. 12A is an example user interface screen for a data collection user interface for collecting human-labelled data for generating rules or training a machine-learned model for filtering spam user profiles from search results. In example embodiments, a search result corresponding to a search query is presented to the user in the user interface. The user may select one of a plurality of user interface elements (e.g., buttons) corresponding to candidate labels for the search result, such as "The only right one," "Perfect match," "Ok match," "Doesn't look ugly," "Please remove it," and "SPAM." Various colors may be assigned to the different labels. Upon selection of a particular label, the search index entry may be highlighted with the color corresponding to the label. Additionally, a summary of the selected label (e.g., "perfect") may be indicated in conjunction with the search index entry. In example embodiments, an initial presentation of the search result to the user may indicate the current status of the entry as indicated by other users. In alternative embodiments, the current status of the entry may not be indicated to the user. In example embodiments, the user may be able to click on the search result to view the full user profile corresponding to the search result before indicating an opinion of the appropriate label for the search result. In this example, the current status of the search result is indicated as "perfect," perhaps based on a selection by the user of the "Perfect match" user interface element or previous selections by other users. Upon selection of a label for the search result, an additional search result may be presented in the user interface for labelling.

Figure 12B:

FIG. 12B is an additional example user interface screen for a data collection user interface for collecting human-labelled data for generating rules or training a machine-learned model for filtering spam user profiles from search results. In this example, the current status of the search result is indicated as "bad," perhaps based on a selection by the user of the "SPAM" user interface element or previous selections of the "SPAM" label by other users. Here, the name field of the search result includes a company name, which may lead human labellers to flag the search result as spam.

Figure 12C:

FIG. 12C is an additional example user interface screen for a data collection user interface for collecting human-labelled data for generating rules or training a machine-learned model for filtering spam user profiles from search results. In this example, the current status of the search result is indicated as "bad," perhaps based on a selection by the user of the "SPAM" user interface element or previous selections of the "SPAM" label by other users. Here, the name field of the search result includes a non-human name, which may lead human labellers to flag the search result as span). Additionally, the search result appears to include field abuses, including a large selection of skills that may bear little or no relation to a corresponding search query.

FIG. 13A is an additional example user interface screen for a data collection user interface for collecting human-labelled data for generating rules or training a machine-learned model for filtering spam user profiles from search results. In this example, the current status of the search result is indicated as "bad," perhaps based on a selection by the user of the "SPAM" user interface element or previous selections of the "SPAM" label by other users. Here, the name field of the search result includes a non-human name. Additionally, the search result appears to include field abuses, including a non-employer name in the employer field.

FIG. 13B is an additional example user interface screen for a data collection user interface for collecting human-labelled data for generating rules or training a machine-learned model for filtering spam user profiles from search results. In this example, the current status of the search result is indicated as "bad," perhaps based on a selection by the user of the "SPAM" user interface element or previous selections of the "SPAM" label by other users. Here, the user profile appears to be of low quality, including a portion of the user's title in the name field and only a title in the title field (without a corresponding employer). Additionally, the location is only generally specified and no content for the other summary fields is included.

FIG. 13C, is an additional example user interface screen for a data collection user interface for collecting human-labelled data for generating rules or training a machine-learned model for filtering spam user profiles from search results. In this example, the current status of the search result is indicated as "bad," perhaps based on a selection by the user of the "SPAM" user interface element or previous selections of the "SPAM" label by other users. Here, the user profile appears to be of low quality, including a duplication of the user's name in the name field and a non-employer name specified in the current employer field. Additionally, other fields are sparsely populated or not populated at all.

Upon collection (e.g., via the data collection user interface) of a sufficient amount of data (e.g., enough human-labelled data to pass a minimum data collection threshold), features of the documents (e.g., user profiles) corresponding to the search results may be identified that are indicative of threshold levels of spaminess of the user profiles. FIG. 14 is a listing of example features and their corresponding descriptions.

FIG. 15 is an example pseudo-code listing describing a few initial rules that may be generated based on the identification of the example features. These initial rules may be selected (e.g., by an administrator of the system) to rule out all obvious cases that cannot be spam (e.g., based on the spam identification precision exceeding a spam-identification-precision threshold). Here, the rules include determining whether the first name and last name fields of the user correspond to previously-generate lexicons corresponding to first names and last names, determining whether fields in the user profile include more than a threshold number (e.g., 2) of "stopping phrases" (e.g., phrases that are previously-identified as being clearly inappropriate for a particular field), determining whether a field includes content that matches content that should be in another field, and combinations of these rules.

FIG. 16 is an example of a partial representation of a machine-learned model as a Python function. Here, the output of the Python function is "1" (indicative of a spam user profile) based on a machine-learned decision tree that iterates through a set of identified document features (e.g., in order of priority based on likelihood of the rule not being satisfied so as to reach the fastest possible identification of the profile as not being spam). Here, the Python function implementation of one example decision tree consists of the following steps (1) determining that the number of standardized companies listed in the user profile is less than or equal to 0.5, (2) determining the number of positions listed in the user profile is less than or equal to 0.5, (3), determining that the number of standardized schools listed in the user profile is less than or equal to 0.5, and (4) determining that number of skills listed in the user profile is less than or equal to 1.5.

Figure 17:
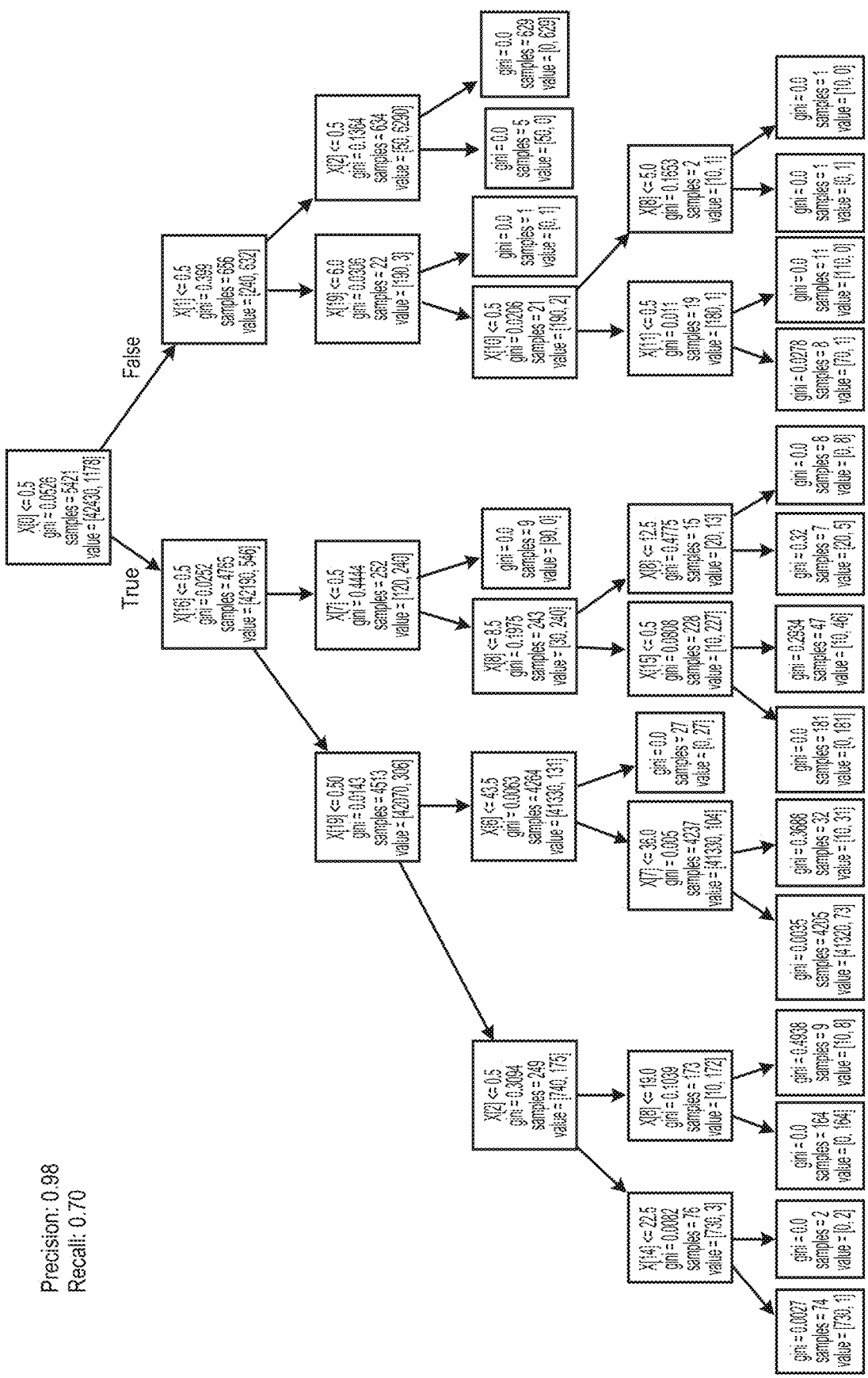
FIG. 17 is an example representation of a decision tree for identifying spam profiles.

FIG. 17 is an example representation of a decision tree for identifying spam profiles. In example embodiments, the results of application of the decision tree may be tested against a "gold standard" dataset (e.g., a data set with correct or expected output) to determine both precision and recall. In example embodiments, various combinations of possible decisions and decision trees are tested and, when the precision and recall of a particular decision model exceed predetermined thresholds, the model may be incorporated into the system (e.g., as a replacement for a rules-based model or for use in conjunction with a rules-based model).

Consider an example table of user profiles identified as spam by application of a rules-based or machine-learned model to a large data set (e.g., millions of user profiles). Here, a first set of the user profiles in the data set may be identified as spam user profiles based on including an empty position field, an empty education field, and duplication of content in the first name field and the last name field. A second set of user profiles may be identified as spam user profiles based on their maxWordFreq (see FIG. 14) being greater than or equal to a ratio (e.g., 0.8). A third set of user profiles may be identified as spam user profiles based on (1) duplicate content being including in the first name field and last name field and duplicate content being included in the company field and the title field or (2) duplicate content being included in the company field and the title field or duplicate content being included in a name field and a company field or title field. A fourth set of user profiles may be identified as spam user profiles based on their uniqueCharNum being less than or equal to a value (e.g., 5) and their uniqueCharRatio being less than a ratio (e.g., 0.26) (see FIG. 14). A fifth set of user profiles may be identified as being spam user profiles based on their maxCharFreq being greater than or equal to a ratio (e.g., 0.8). A sixth set of user profiles may be identified as being spam user profiles based on their uniqueCharNum being equal to a value (e.g., 1). A seventh set of user profiles may be identified as spam user profiles based on a same keyword being included in each of the firstname, lastname, headline, company, and title fields. An eighth set of user profiles may be identified as being spam user profiles based on their numDuplicatePositions being greater than a value (e.g., 6). A ninth set of user profiles may be identified as being spam user profiles based on their numCurrPos being greater than a value (e.g., 20) or their numPrevPos being greater than a value (e.g., 43) (e.g., after whitelisted titles were removed). A tenth set of user profiles may be identified as being spam user profiles based on their numEdu being greater than a value (e.g., 36) or their numStdEdu being greater than a value (e.g., 22). Based tables of results such as these that are generated upon application of the rules-based or machine-learned model to a large data set, the rules-based or machine-learned models may be updated such that, for example, the criteria for detecting a spam user profile are prioritized based on their effectiveness at identifying spam user profiles, thus improving the efficiency of the execution of decision tree in future applications of the models.

Figure 18:
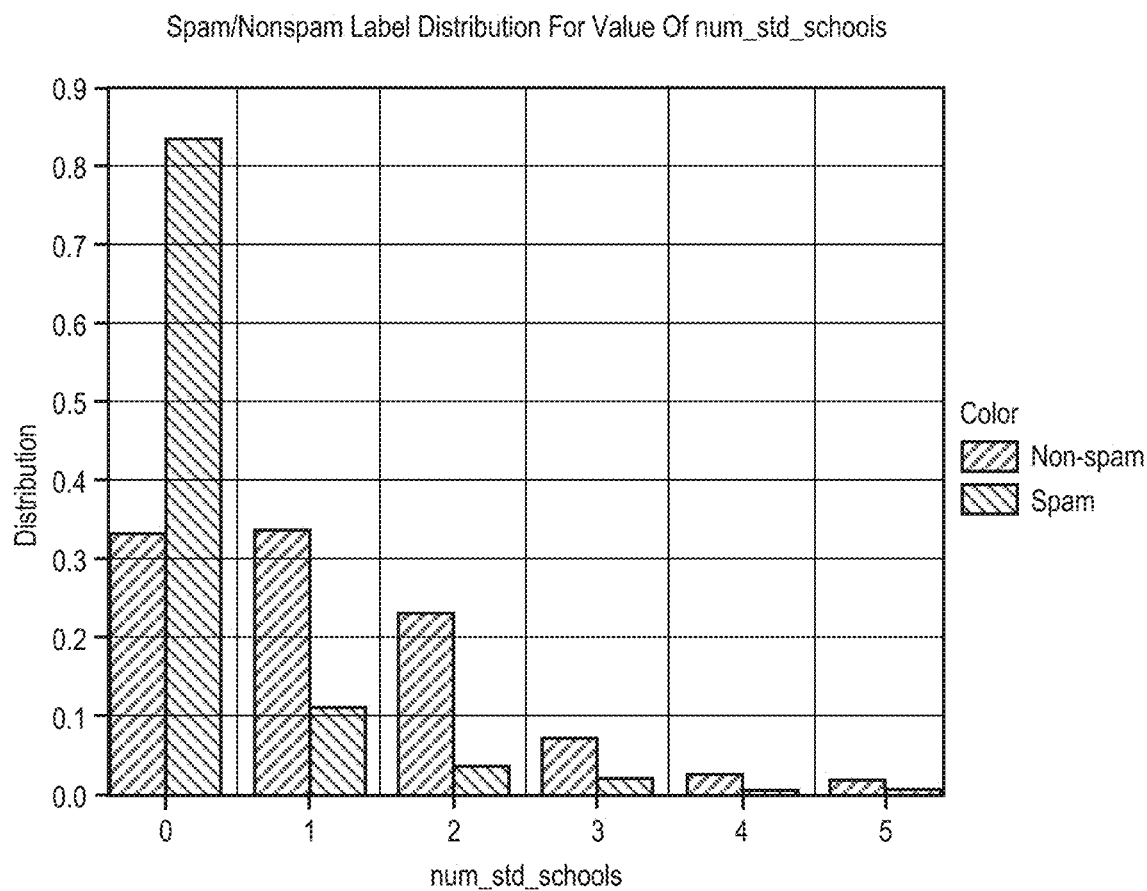
FIG. 18 is an example plot that is generated and used by the system to identify whether an attribute of a document is useful as a feature for training of the machine-learned model.

FIG. 18 is an example plot that is generated and used by the system to identify whether an attribute of a document is useful as a feature for training of the machine-learned model. In example embodiments, whether an attribute of a document is useful as a feature depends on whether the attribute has a distinguishable distribution for one or more labels associated with the attribute. In other words, when the distances of distribution of values associated with the labels are far away from each other (e.g., for user profiles that are classified as spam in comparison to user profiles that are classified as non-spam), then the attribute or a particular label associated with the attribute may be deemed to be a useful feature for training purposes. Consider the "num_std_schools" attribute as an example. Here, "num_std_schools" represents a number of standardized schools that are included in one or more education fields of a user profile (e.g., which may correspond to "numStdEdu" of FIG. 14). The labels associated with the "num_std_schools" attribute include numbers ranging from 1 to X, where X is the maximum number of standardized schools that may be specified in a user profile. From a sample data set of user profiles that have been classified as spam or non-spam, the example plot shows distributions for a subset of the labels (e.g., 1 to 5). Here, the label zero has a wide separation in distributions of values between spam and non-spam profiles, suggesting that user profiles with no standardized schools specified have a high likelihood of being classified as spam user profiles. In example embodiments, when the distribution of a particular label or set of labels associated with an attribute meet or exceed a distribution threshold, the attribute or the labels may be selected as one or more features for training of the machine-learned model (e.g., for passing into the machine-learned model as one or more components of a feature vector).

Figure 19:
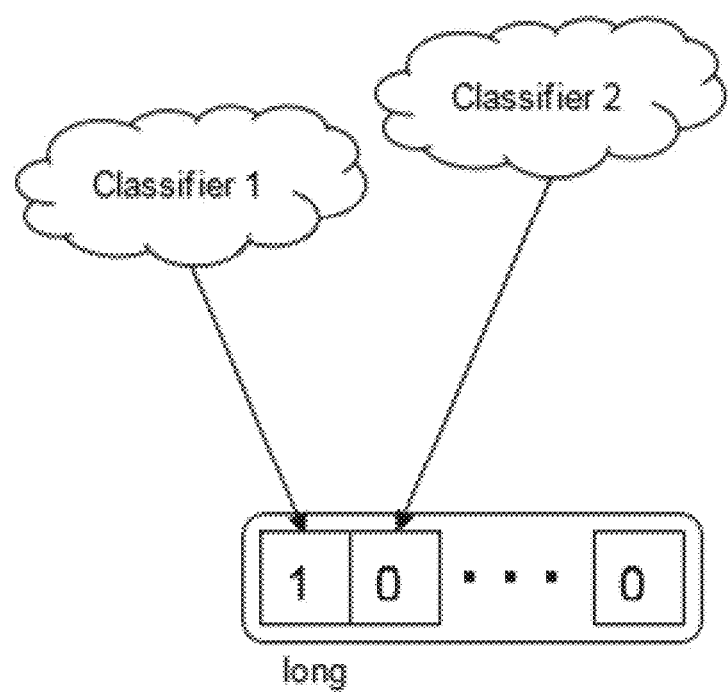
FIG. 19 is an example bitmap that may be added to a database index entry for a user profile to indicate one or more spam classifications associated the user profile.

FIG. 19 is an example bitmap (e.g., of long integer data type) that may be added to a database index entry for a user profile to indicate one or more spam classifications associated the user profile. In example embodiments, each bit in the bitmap corresponds to a specific spam classifier. Here, a bit-value of 1 in the first bit field of the bitmap indicates that the user profile has been associated with Classifier 1, a bit-value of zero in the second bit field of the bitmap indicates that the user profile has not been associated with Classifier 2, and so on.

In example embodiments, one of multiple approaches may be selected to deal with spam user profiles. A first approach may be to add a field, such as binary or double field, to a forward index associated with the user profiles. The value stored in the field may then be used as a feature (e.g., a binary feature or a double-value feature) to demote spam profiles identified as spam (e.g., by a rules-based or machine-learned model). The pros of this approach include that, even if there is a mistake in detecting spam user profiles, they are still included in the search results list. They are just lower in the list. The cons of this approach include that the spam profiles may still take places of "good" (e.g., non-spam) user profiles that could have been retrieved and shown to the user.

A second approach may be to add a field, such as a binary or long field, to the forward index. This field may be used to filter out retrieved documents that are flagged as spam and remove them from the candidate search result set. The pros of this approach include that spammy user profiles will never be surfaced to a user, improving the user experience and user trust in the search results. In example embodiments, spam user profiles of a first-degree connection of the searcher or spam user profiles of the searcher are not filtered out. Additionally, ranking of profiles will be more efficient because spammy profiles will not be considered during the ranking process. The cons of this approach include that good search results may be removed from the search results altogether (e.g., based on false positives).

A third approach may be to add a field, such as a binary or long field, to an inverted index associated with the user profiles. Pros of this approach relate to optimizing of the query processing. Cons of this approach are that keys in the inverted index entry would need to be updated upon introduction of each new spam classifier.

An example field may be defined in pseudo code as "<field name="isProfileSpam" type="long"/>". In example embodiments, each bit in the isProfileSpam field represents one spam detector classifier that explains whether the user profile is spam or not according to that classifier. One long field can have up to 64 spam classifiers. A benefit of using a bitmap includes that it is easier for A/B testing purposes. For example, in a typical indexing framework, there may not be an easy way of A/B testing. With a bitmap, testing a new spam classifier merely requires using a bit for each classifier and then deciding which classifier to use during filtering. Another benefit of using a bitmap is it is easier to deprecate a bad classifier. In a typical indexing framework, it may not be easy to improve a classifier. For example, if the rules of the spam detector are changed, it can cause a integration or regression test to fail as it compares the current index with the old index and sees a significant change. With a bitmap, the old classifier does not need to be changed. Instead, a new classifier is created and assigned to a new bit-field of the bitmap. Then, in filter, the correct bit (e.g., determined through A/B testing) may then be checked.

Example Mobile Device

Figure 20:
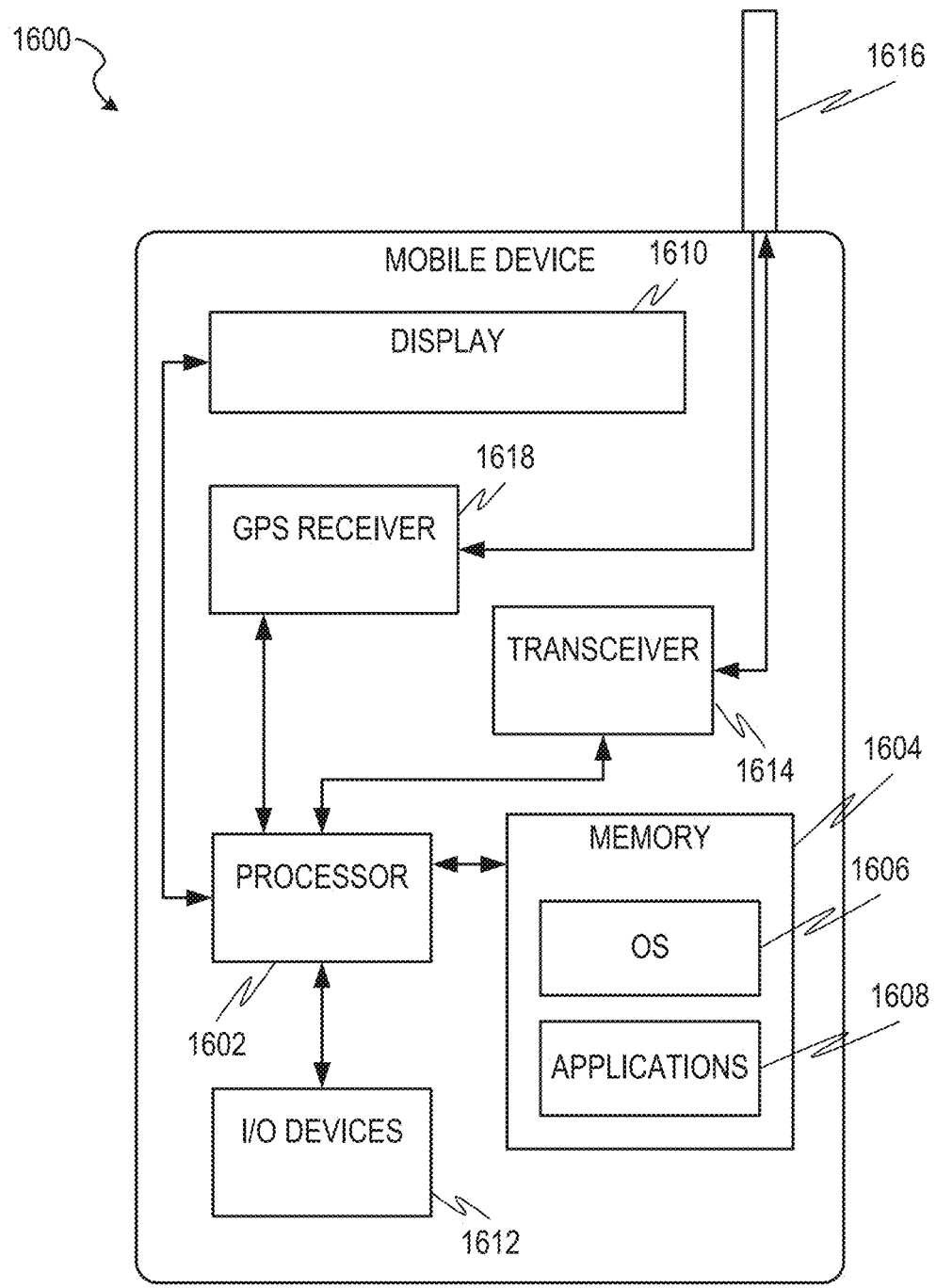
FIG. 20 is a block diagram illustrating a mobile device, in accordance with example embodiments.

FIG. 20 is a block diagram illustrating a mobile device 1600, according to an example embodiment. The mobile device 1600 can include a processor 1602. The processor 1602 can be any of a variety of different types of commercially available processors suitable for mobile devices 1600 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 1600. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 21:
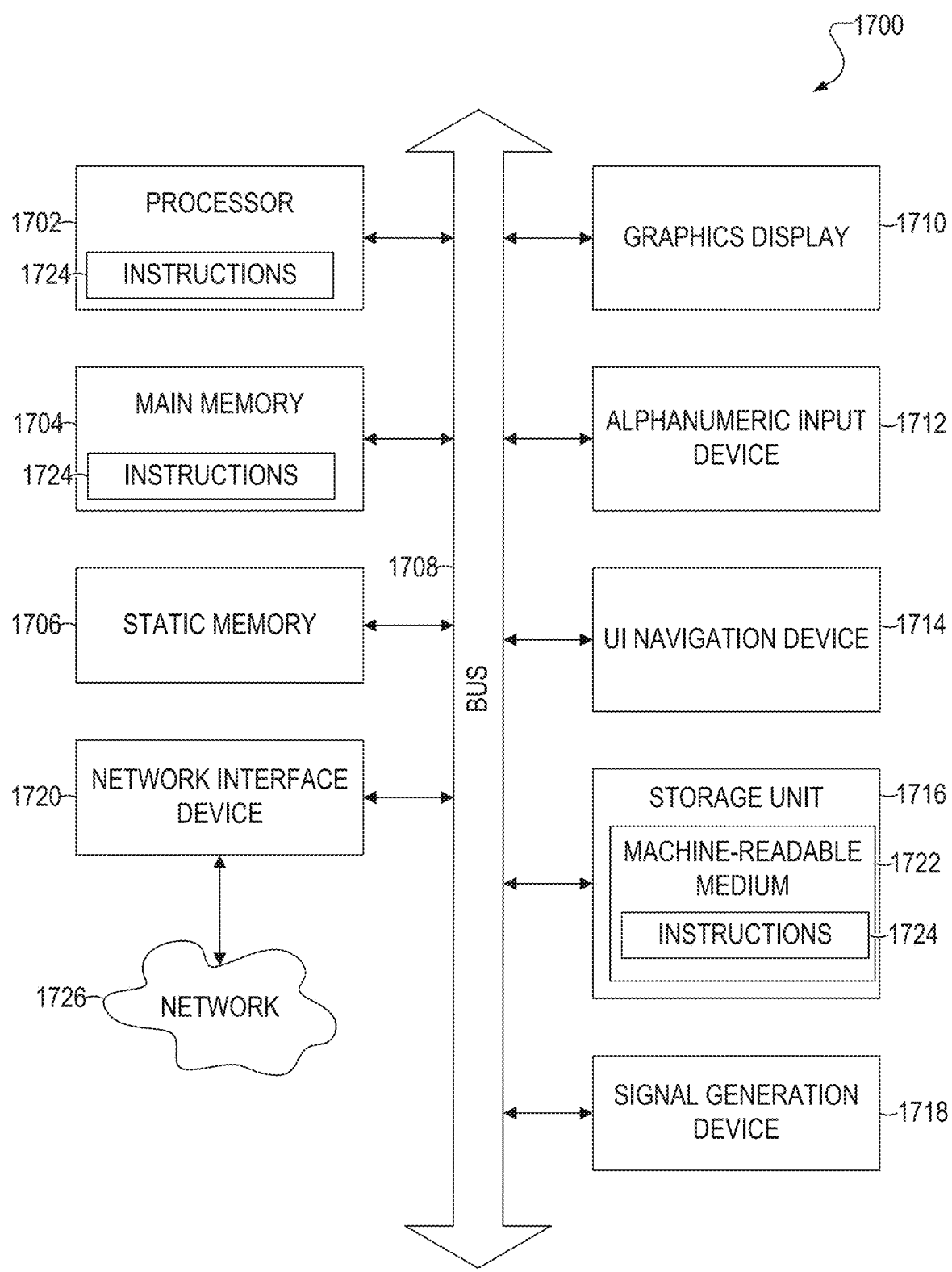
FIG. 21 is a block diagram of an example computer system on which methodologies and operations described herein may be executed, in accordance with example embodiments.

FIG. 21 is a block diagram of an example computer system 1700 on which methodologies and operations described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 1700 may further include a graphics display unit 1710 (e.g., a liquid crystal display (LCD) or a cathode ray tube (CRT)). The computer system 1700 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 1700, the main memory 1704 and the processor 1702 also constituting machine-readable media.

While the machine-readable medium 1722 is shown in an example embodiment to be a single medium, the term "machine-readable medium" may include a single medium or multiple media a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more computer processors;
   one or more computer memories;
   a set of instructions incorporated into the one or more computer memories, the set of instructions configuring the one or more computer processors to perform operations for improving a search user interface by demoting a set of spam user profiles included in a listing of candidate user profiles that are to be presented in response to a search request, the operations comprising:
   receiving the search request from a client device, the search request requesting the listing of candidate user profiles corresponding to a search query;
   determining the listing of candidate user profiles corresponding to the search query, wherein the determining of the listing of candidate user profiles includes filtering out previously-identified spam user profiles based on spam fields included in forward indexes of the previously-identified spam user profiles and wherein each of the spam fields is a data field that indicates a set, of a plurality of spam classifiers that has been identified by a trained spam detection model as corresponding to one of the previously-identified spam user profiles;
   applying the trained spam detection model to each of the candidate user profiles to identify the set of spam user profiles;
   performing the demoting of the spam user profiles; and
   communicating the listing of candidate user profiles for presentation in the search user interface, the presentation reflecting the demoting of the spam user profiles.

2. The system of claim 1, wherein the plurality of spam classifiers includes at least one of an identity spam classifier, a profile abuse classifier, a junk classifier, a non-human classifier, a low-quality classifier, and an advertisement classifier.

3. The system of claim 1, wherein the filtering out of the previously-identified spam user profiles occurs in a post-retrieval phase of the determining of the listing of candidate user profiles corresponding to the search query.

4. The system of claim 1, further comprising adding or updating a spam field to forward indexes corresponding to each of the set of spam user profiles, the spam field specifying a class of spam of each of the set of spam user profiles identified by the trained spam detection model.

5. The system of claim 1, wherein the applying of the trained spam detection model includes analyzing weighted features of each of the candidate user profiles, the weighted features pertaining to name duplications included in each of the candidate user profiles.

6. A method comprising:
   improving a search user interface by configuring one or more processors of a networked system to demote a set of spam user profiles included in a listing of candidate user profiles that are to be presented in response to a search request, the operations comprising:
   receiving the search request from a client device, the search request requesting the listing of candidate user profiles corresponding to a search query;
   determining the listing of candidate user profiles corresponding to the search query, wherein the determining of the listing of candidate user profiles includes filtering out previously-identified spam user profiles based on spam fields included in forward indexes of the previously-identified spam user profiles and wherein each of the spam fields is a data field that indicates a set, of a plurality of spam classifiers that, has been identified by a trained spam detection model as corresponding to one of the previously-identified spam user profiles;
   applying the trained spam detection model to each of the candidate user profiles to identify the set of spam user profiles;
   performing the demoting of the spam user profiles; and
   communicating the fisting of candidate user profiles for presentation in the search user interface, the presentation reflecting the demoting of the spam user profiles.

7. The method of claim 6, wherein the plurality of spam classifiers includes at least one of an identity spam classifier, a profile abuse classifier, a junk classifier, a non-human classifier, a low-quality classifier, and an advertisement classifier.

8. The method of claim 6, wherein the filtering out of the previously-identified spam user profiles occurs in a post-retrieval phase of the determining of the listing of candidate user profiles corresponding to the search query.

9. The method of claim 6, further comprising adding or updating a spam field to forward indexes corresponding to each of the set of spam user profiles, the spam field specifying a class of spam of each of the set of spam user profiles identified by the trained spam detection model.

10. The method of claim 6, wherein the applying of the trained spam detection model includes analyzing weighted features of each of the candidate user profiles, the weighted features pertaining to name duplications included in each of the candidate user profiles.

11. A non-transitory machine-readable storage medium embodying a set of instructions that, when executed by one or more processors, causes the one or more processors to perform operations for improving a search user interface by demoting a set of spam user profiles included in a listing of candidate user profiles that are to be presented in response to a search request, the operations comprising:

receiving the search request from a client device, the search request requesting the listing of candidate user profiles corresponding to a search query;

determining the listing of candidate user profiles corresponding to the search query, wherein the determining of the listing of candidate user profiles includes filtering out previously-identified spam user profiles based on spam fields included in forward indexes of the previously-identified spam user profiles and wherein each of the spam fields is a data field that indicates a set of a plurality of spam classifiers that has been identified by a trained spam detection model as corresponding to one of the previously-identified spam user profiles;

applying the trained spam detection model to each of the candidate user profiles to identify the set of spam user profiles;

performing the demoting of the spam user profiles; and communicating the listing of candidate user profiles for presentation in the search user interface, the presentation reflecting the demoting of the spam user profiles.

12. The non-transitory machine-readable storage medium of claim 11, wherein the plurality of spam classifiers includes at least one of an identity spam classifier, a profile abuse classifier, a junk classifier, a non-human classifier, a low-quality classifier, and an advertisement classifier.

13. The non-transitory machine-readable storage medium of claim 11, wherein the filtering out of the previously-identified spam user profiles occurs in a post-retrieval phase of the determining of the listing of candidate user profiles corresponding to the search query.

14. The non-transitory machine-readable storage medium of claim 11, further comprising adding or updating a spam field to forward indexes corresponding to each of the set of spam user profiles, the spam field specifying a class of spam of each of the set of spam user profiles identified by the trained spam detection model.

* * * * *